United States Patent
Yu et al.

(10) Patent No.: US 10,148,331 B2
(45) Date of Patent: Dec. 4, 2018

(54) METHOD AND APPARATUS FOR TRACKING BEAM IN WIRELESS COMMUNICATION SYSTEM

(71) Applicant: Samsung Electronics Co., Ltd., Suwon-si, Gyeonggi-do (KR)

(72) Inventors: Hyun-Kyu Yu, Yongin-si (KR); Tae-Young Kim, Seongnam-si (KR); Jeong-Ho Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/491,396

(22) Filed: Apr. 19, 2017

(65) Prior Publication Data

US 2017/0230093 A1 Aug. 10, 2017

Related U.S. Application Data

(63) Continuation of application No. 15/262,796, filed on Sep. 12, 2016, which is a continuation of application
(Continued)

(30) Foreign Application Priority Data

Aug. 11, 2011 (KR) .................. 10-2011-0080062

(51) Int. Cl.
*H04B 7/06* (2006.01)
*H04L 1/18* (2006.01)
(Continued)

(52) U.S. Cl.
CPC ......... *H04B 7/0617* (2013.01); *H04B 7/0623* (2013.01); *H04L 1/189* (2013.01);
(Continued)

(58) Field of Classification Search
CPC .. H04B 7/0623; H04B 7/0617; H04B 7/0684; H04B 1/00; H04B 7/06; H04L 1/189;
(Continued)

(56) References Cited

U.S. PATENT DOCUMENTS 5,987,037 A 11/1999 Gans
7,302,238 B2 * 11/2007 Fujii .................... H04B 7/0408
455/101

(Continued)

FOREIGN PATENT DOCUMENTS

CN 1607743 A 4/2005
CN 101124803 A 2/2008
(Continued)

OTHER PUBLICATIONS

Indian Office Action dated Sep. 12, 2018, for corresponding Indian Patent Application No. 185/KOLNP/2014.
(Continued)

*Primary Examiner* — Pablo Tran
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method for operating a terminal in a wireless communication system comprises transmitting, to a base station, at least one reference signal through at least one first transmission beam and if ACK information for the at least one reference signal is received from the base station, transmitting, to the base station, the at least one reference signal through at least one second transmission beam. A width of the at least one second transmission beam is greater than a width of the at least one first transmission beam.

14 Claims, 12 Drawing Sheets

Related U.S. Application Data

No. 13/569,550, filed on Aug. 8, 2012, now Pat. No. 9,450,661.

(51) Int. Cl.
*H04L 5/00* (2006.01)
*H04W 72/04* (2009.01)
*H04W 88/02* (2009.01)

(52) U.S. Cl.
CPC .......... *H04L 5/0048* (2013.01); *H04B 7/0684* (2013.01); *H04W 72/042* (2013.01); *H04W 88/02* (2013.01)

(58) Field of Classification Search
CPC ...... H04L 1/18; H04W 88/02; H04W 72/042; H04W 72/00; H04M 1/00; H04K 1/00
USPC ... 455/562.1, 63.1, 114.1, 278.1, 296, 67.13, 455/135, 161.3, 277.2, 13.3, 63.4, 82; 370/310, 328, 330, 332
See application file for complete search history.

(56) References Cited

U.S. PATENT DOCUMENTS

| | | | |
|---|---|---|---|
| 7,420,508 B2 | 9/2008 | Ksienski et al. | |
| 8,140,024 B2* | 3/2012 | Prasad | H04B 7/088 370/328 |
| 8,639,204 B2 | 1/2014 | Corman et al. | |
| 8,755,755 B2* | 6/2014 | Hoshino | H04B 7/0617 455/39 |
| 8,804,796 B2* | 8/2014 | Zhou | H04L 25/02 375/219 |
| 9,750,003 B2* | 8/2017 | Yu | H04W 72/042 |
| 2004/0213187 A1 | 10/2004 | Fujil | |
| 2005/0221861 A1 | 10/2005 | Zeira | |
| 2006/0025178 A1 | 2/2006 | Tao et al. | |
| 2006/0153227 A1 | 7/2006 | Hwang et al. | |
| 2008/0008110 A1 | 1/2008 | Kishigami et al. | |
| 2009/0196203 A1 | 8/2009 | Taira et al. | |
| 2009/0232245 A1 | 9/2009 | Lakkis | |
| 2009/0318157 A1* | 12/2009 | Hoshino | H04B 7/0452 455/450 |
| 2010/0056062 A1 | 3/2010 | Zhang et al. | |
| 2010/0103044 A1 | 4/2010 | Hoshino et al. | |
| 2010/0190450 A1 | 7/2010 | Stirling-Gallacher et al. | |
| 2011/0235730 A1 | 9/2011 | Noh et al. | |
| 2011/0316744 A1 | 12/2011 | Morioka et al. | |
| 2012/0028588 A1 | 2/2012 | Morioka et al. | |
| 2013/0094468 A1 | 4/2013 | Ko et al. | |
| 2013/0201944 A1 | 8/2013 | Kishigami et al. | |
| 2013/0215844 A1 | 8/2013 | Seol et al. | |
| 2013/0258885 A1 | 10/2013 | Yu et al. | |
| 2013/0286960 A1 | 10/2013 | Li et al. | |

FOREIGN PATENT DOCUMENTS

| | | |
|---|---|---|
| CN | 101359952 A | 2/2009 |
| CN | 101485107 A | 7/2009 |
| CN | 101652936 A | 2/2010 |
| CN | 101789817 A | 7/2010 |
| CN | 101978661 A | 2/2011 |
| EP | 2 134 016 A1 | 12/2009 |
| JP | 2006-005908 A | 1/2006 |
| JP | 2010212804 A | 9/2010 |
| KR | 10-2010-0063625 A | 6/2010 |
| WO | 00/27139 A1 | 5/2000 |
| WO | 2008-004609 A1 | 1/2008 |
| WO | 2008-013173 A1 | 1/2008 |
| WO | 2010/098203 A1 | 9/2010 |

OTHER PUBLICATIONS

Japanese Notice of Patent Grant dated Oct. 3, 2018, for corresponding Japanese Patent Application No. JP 2017-092599.

* cited by examiner

METHOD AND APPARATUS FOR TRACKING BEAM IN WIRELESS COMMUNICATION SYSTEM

PRIORITY

This application is a continuation application of prior application Ser. No. 15/262,796, filed on Sep. 12, 2016, which is a continuation of prior application Ser. No. 13/569,550, filed on Aug. 8, 2012, which will issue as U.S. Pat. No. 9,450,661 on Sep. 20, 2016 and claimed the benefit under 35 U.S.C. § 119(a) of a Korean patent application filed on Aug. 11, 2011 in the Korean Intellectual Property Office and assigned Serial number 10-2011-0080062, the entire disclosure of each of which is hereby incorporated by reference.

BACKGROUND OF THE INVENTION

1. Field of the Invention

The present invention relates to a wireless communication system. More particularly, the present invention relates to a method and an apparatus for tracking a beam in a wireless communication system.

2. Description of the Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Wireless communication systems have developed in a direction for supporting a higher data transmission rate in order to meet continuously increasing wireless data traffic demand. Recently, 4G wireless systems have been pursued as a technology for improving a spectral efficiency generally in order to increase a data transmission rate. However, it is difficult to meet an explosively increasing wireless data traffic demand using only such a spectral efficiency improvement technology.

In order to address the increasing demand, a very wide frequency band may be used. Yet, since it is very difficult to secure a wide frequency band in a frequency band that is less than 10 GHz and is currently in use, a higher frequency band needs to be secured. However, as a transmission frequency for wireless communication is increased, the distance of reach, i.e., the range, of a radio wave gets relatively short, and there is a reduction of coverage area. In order to increase the distance of reach of the radio wave, a beam-forming technology may be used.

Generally, transmission beam-forming is a method for concentrating a region of propagation or transmission of a radio wave in a specific direction using a plurality of antennas. A plurality of antennas which are arranged together is referred to as an antenna array, and an antenna included in the antenna array is referred to as an array element. When transmission beam-forming is used, a transmission distance of a signal may be increased, and since the signal is generally not transmitted in other directions except for a relevant direction, interference from other user signals may be reduced significantly.

Meanwhile, a reception side, or a receiver, may perform reception beam-forming using a reception antenna array. Reception beam-forming also concentrates reception of a radio wave in a specific direction to increase a gain of a signal entering the receiver from a relevant direction and may exclude a signal entering from other directions except for the relevant direction, thereby excluding interfering signals. To perform basic beam-forming, a technology for allowing a base station and a terminal to efficiently select a transmission and/or reception beam is required. In addition, if a beam is not correctly set due to a specific error during a transmission and/or reception beam setting process, then spectral efficiency deterioration may occur. Accordingly, a base station should be allowed to control an error state and a stable beam tracking method should be provided.

Therefore, a beam tracking method and an apparatus thereof, for efficiently selecting a transmission and/or reception beam-forming in a wireless communication system are required.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for efficiently tracking a beam in a wireless communication system.

In accordance with an aspect of the present invention, a method for tracking a beam by a terminal in a wireless communication system is provided. The method includes receiving a plurality of downlink reference signals from a base station to determine at least one downlink transmission beam pattern, transmitting, to the base station, a plurality of uplink reference signals, each having identifier information corresponding to the determined at least one downlink transmission beam pattern to the base station, and receiving, from the base station, ACKnowledgement (ACK) information indicating that an identifier included in the identifier information corresponding to the determined at least one downlink transmission beam pattern has been successfully received in the base station from among identifier information corresponding to an uplink transmission beam pattern and the plurality of uplink reference signals.

In the embodiment, a wide beam pattern or a previously received at least one downlink transmission beam pattern is used as the downlink transmission beam pattern upon receiving at least one of the first NACK information and the second NACK information indicating that the base station has not successfully detected the identifier included in the identifier information corresponding to the determined at least one downlink transmission beam pattern.

In accordance with another aspect of the present invention, a method for tracking a beam by a base station in a wireless communication system is provided. The method includes transmitting a plurality of downlink reference signals to a terminal, receiving, from the terminal, a plurality of uplink reference signals, each having identifier information corresponding to at least one downlink transmission beam pattern determined by the terminal from the terminal according to the plurality of downlink reference signals, and transmitting ACK information indicating that identifier information corresponding to an uplink transmission beam pattern determined according to the plurality of uplink reference signals and an identifier included in the identifier information corresponding to the determined at least one downlink transmission beam pattern have been successfully received.

In the embodiment, a wide beam pattern or a previously received at least one downlink transmission beam pattern is used as the downlink transmission beam pattern upon receiving at least one of the first NACK information and the second NACK information indicating that the base station has not successfully detected the identifier included in the identifier information corresponding to the determined at least one downlink transmission beam pattern.

In accordance with another aspect of the present invention, a method for tracking a beam by a terminal in a wireless communication system is provided. The method includes receiving, from a base station, a plurality of downlink reference signals to determine at least one downlink transmission beam pattern, transmitting, to the base station, identifier information corresponding to at least one downlink transmission pattern using the determined at least one uplink transmission beam pattern, and receiving ACK information from the base station upon the base station successfully receiving the identifier information corresponding to the at least one downlink transmission beam pattern.

In accordance with another aspect of the present invention, a method for tracking a beam by a base station in a wireless communication system is provided. The method includes transmitting a plurality of downlink reference signals to a terminal, receiving, from the terminal, identifier information corresponding to at least one downlink transmission beam pattern determined by the terminal according to the plurality of downlink reference signals, and transmitting ACK information to the terminal when an identifier corresponding to the at least one downlink transmission beam pattern is successfully received.

In accordance with another aspect of the present invention, a method for tracking a beam by a terminal in a wireless communication system is provided. The method includes transmitting a plurality of uplink reference signals to a base station, receiving, from the base station, identifier information corresponding to an uplink transmission beam pattern according to the plurality of uplink reference signals, and transmitting ACK or Negative ACKnowledgement (NACK) according to whether the identifier information corresponding to the uplink transmission beam pattern is received.

In the embodiment, the method further comprises retransmitting a plurality of uplink reference signals to the base station upon the base station not successfully detecting index information corresponding to an uplink transmission beam pattern and re-receiving the identifier information corresponding to the uplink transmission beam pattern from the base station according to the plurality of uplink reference signals.

In accordance with another aspect of the present invention, a method for tracking a beam by a base station in a wireless communication system is provided. The method includes receiving a plurality of uplink reference signals from a terminal, transmitting, to the terminal, identifier information corresponding to an uplink transmission beam pattern according to the plurality of uplink reference signals, and receiving ACK or NACK according to whether the identifier information corresponding to the uplink transmission beam pattern is received.

In accordance with another aspect of the present invention, an apparatus for tracking a beam by a terminal in a wireless communication system is provided. The apparatus includes a controller for receiving, from a base station, a plurality of downlink reference signals from a base station to determine at least one downlink transmission beam pattern, a transmitter for transmitting, to the base station, a plurality of uplink reference signals, each having identifier information corresponding to the determined at least one downlink transmission beam pattern, and a receiver for receiving, from the base station, ACK information indicating that an identifier included in the identifier information corresponding to the determined at least one downlink transmission beam pattern has been successfully received at the base station from among identifier information corresponding to an uplink transmission beam pattern and the plurality of uplink reference signals.

In the embodiment, the transmitter further transmits ACK information to the base station upon successfully detecting the identifier information corresponding to the uplink transmission beam pattern, and transmits Negative ACKnowledgement (NACK) information to the base station upon not successfully detecting the identifier information corresponding to the uplink transmission beam pattern.

In the embodiment, the controller further successfully detects the identifier information corresponding to the uplink transmission beam pattern, and the receiver re-receives, from the base station, the identifier included in the identifier information corresponding to the determined at least one downlink transmission beam pattern according to a plurality of previous uplink transmission beam patterns upon receiving Negative ACKnowledgement (NACK) information indicating that the base station has not successfully received the identifier included in the identifier information corresponding to the determined at least one downlink transmission beam pattern from among the plurality of uplink reference signals.

In the embodiment, the transmitter further retransmits, to the base station, a plurality of uplink reference signals comprising identifier information corresponding to the determined at least one downlink transmission beam pattern upon not successfully detecting the identifier information corresponding to the uplink transmission beam pattern and upon receiving Negative ACKnowledgement (NACK) information indicating that the base station has not successfully received the identifier included in the identifier information corresponding to the at least one downlink transmission beam pattern from among the plurality of uplink reference signals, and the receiver re-receives ACK information indicating that the base station has successfully received the identifier included in the identifier information corresponding to the determined at least one downlink transmission beam pattern from among the identifier information corresponding to the uplink transmission beam pattern and the plurality of uplink reference signals.

In the embodiment, the controller further uses a wide beam pattern or a previously received at least one downlink transmission beam pattern as the downlink transmission beam pattern upon receiving the NACK information indicating that the base station has not successfully received the identifier corresponding to the at least one downlink transmission beam pattern from among the plurality of uplink reference signals.

In accordance with another aspect of the present invention, an apparatus for tracking a beam by a base station in a wireless communication system is provided. The apparatus includes a transmitter for transmitting a plurality of downlink reference signals to a terminal, and a receiver for receiving, from the terminal, a plurality of uplink reference signals, each having identifier information corresponding to at least one downlink transmission beam pattern determined by the terminal according to the plurality of downlink reference signals, wherein the transmitter transmits ACK information indicating that both identifier information corresponding to an uplink transmission beam pattern determined according to the plurality of uplink reference signals and an identifier included in the identifier information corresponding to the determined at least one downlink transmission beam pattern have been successfully received.

In the embodiment, the receiver further receives ACK information from the terminal upon the terminal successfully detecting the identifier information corresponding to the uplink transmission beam pattern, and the transmitter receives Negative ACKnowledgement (NACK) information from the terminal upon the terminal not successfully detecting the identifier information corresponding to the uplink transmission beam pattern.

In the embodiment, the transmitter further retransmits the identifier corresponding to the at least one downlink transmission beam pattern to the terminal upon successfully detecting the identifier information corresponding to the uplink transmission beam pattern and upon transmitting Negative ACKnowledgement (NACK) information indicating that the identifier included in the identifier information corresponding to the determined at least one downlink transmission beam pattern has not been successfully received.

In the embodiment, the receiver further re-receives a plurality of uplink reference signals comprising identifier information corresponding to the determined at least one downlink transmission beam pattern upon not successfully detecting the identifier information corresponding to the uplink transmission beam pattern and upon transmitting Negative ACKnowledgement (NACK) information indicating that the identifier included in the identifier information corresponding to the determined at least one downlink transmission beam pattern has not been successfully received, and wherein the transmitter retransmits, to the terminal, ACK information indicating that the identifier included in the identifier information corresponding to the determined at least one downlink transmission beam pattern has been successfully received and retransmits the plurality of uplink reference signals to the terminal.

In the embodiment, a wide beam pattern or a previously received at least one downlink transmission beam pattern is used as the downlink transmission beam pattern upon receiving NACK information indicating that the identifier included in the identifier information corresponding to the determined at least one downlink transmission beam pattern has not been successfully received.

In accordance with another aspect of the present invention, an apparatus for tracking a beam by a terminal in a wireless communication system is provided. The apparatus includes a controller for receiving, from a base station, a plurality of downlink reference signals to determine at least one downlink transmission beam pattern, a transmitter for transmitting, to the base station, identifier information corresponding to at least one downlink transmission pattern, and a receiver for receiving ACK information from the base station upon the base station successfully receiving the identifier information corresponding to the at least one downlink transmission beam pattern.

In the embodiment, the transmitter further retransmits the identifier information corresponding to the determined at least one downlink transmission beam pattern to the base station using the determined at least one uplink transmission beam pattern upon not successfully receiving the identifier information corresponding to the at least one downlink transmission pattern at the base station.

In the embodiment, the transmitter further transmits a plurality of uplink reference signals to the base station upon the base station not successfully receiving the identifier information corresponding to the at least one downlink transmission beam pattern, wherein the receiver receives, from the base station, identifier information corresponding to an uplink transmission beam pattern, and transmits an ACK or a Negative ACKnowledgement (NACK) according to whether the identifier information corresponding to the uplink transmission beam pattern is received.

In accordance with another aspect of the present invention, an apparatus for tracking a beam by a base station in a wireless communication system is provided. The apparatus includes a transmitter for transmitting a plurality of downlink reference signals to a terminal, and a receiver for receiving, from the terminal, identifier information corresponding to at least one downlink transmission beam pattern determined by the terminal according to the plurality of downlink reference signals, wherein the transmitter transmits ACK information to the terminal upon successfully receiving an identifier included in the identifier information corresponding to the determined at least one downlink transmission beam pattern.

In accordance with aspect of the present invention, an apparatus for tracking a beam by a terminal in a wireless communication system is provided. The apparatus includes a transmitter for transmitting a plurality of uplink reference signals to a base station, and a receiver for receiving, from the base station, identifier information corresponding to an uplink transmission beam pattern according to the plurality of uplink reference signals, wherein the transmitter transmits an ACK or a NACK according to whether the identifier information corresponding to the uplink transmission beam pattern is received.

In the embodiment, the transmitter further retransmits a plurality of uplink reference signals to the base station upon the base station not successfully detecting the identifier information corresponding to the uplink transmission beam pattern, and wherein the receiver re-receives, from the base station, the identifier information corresponding to the uplink transmission beam pattern according to the plurality of uplink reference signals.

In the embodiment, the controller further receives a plurality of downlink reference signals from the base station to determine at least one downlink transmission beam pattern upon the base station not successfully detecting the identifier information corresponding to the uplink transmission beam pattern, In the embodiment, the transmitter further transmits, to the base station, identifier information corresponding to the at least one downlink transmission pattern, and transmits, to the base station, a plurality of uplink reference signals, and the receiver receives, from the base station, the identifier information corresponding to the uplink transmission beam pattern according to the plurality of uplink reference signals.

In accordance with another aspect of the present invention, an apparatus for tracking a beam by a base station in a wireless communication system is provided. The apparatus includes a receiver for receiving a plurality of uplink reference signals from a terminal, and a transmitter for transmitting, to the terminal, identifier information corresponding to an uplink transmission beam pattern according to the plurality of uplink reference signals, wherein the receiver receives an ACK or a NACK according to whether the identifier information corresponding to the uplink transmission beam pattern is received.

In accordance with another aspect of the present invention, a method for operating a terminal in a wireless communication system comprises transmitting, to a base station, at least one reference signal through at least one first transmission beam and if ACK information for the at least one reference signal is received from the base station, transmitting, to the base station, the at least one reference signal through at least one second transmission beam. A width of the at least one second transmission beam is greater than a width of the at least one first transmission beam.

In accordance with another aspect of the present invention, an apparatus for a base station in a wireless communication system comprises a transceiver configured to receive, from a terminal, at least one reference signal through at least one first reception beam and if ACK information for the at least one reference signal is transmitted to the terminal, receive, from the terminal, the at least one reference signal through at least one second reception beam. A width of the at least one second reception beam is greater than a wider than the at least one first reception beam.

In accordance with another aspect of the present invention, an apparatus for a terminal in a wireless communication system comprises a transceiver configured to transmit, to a base station, at least one reference signal through at least one first transmission beam, and if ACK information for the at least one reference signal is received from the base station, transmit, to the base station, the at least one reference signal through at least one second transmission beam. A width of the at least one second transmission beam is greater than a width of the at least one first transmission beam.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for tracking a beam in a wireless communication system.

Hereinafter, exemplary embodiments describe beam tracking methods for three methods. However, the present invention is not limited thereto, and other similar apparatuses and methods for tracking a beam in a wireless communication system according to the present invention may be used. A first method is for simultaneously performing beam setting for a downlink and an uplink. A second method is for setting a downlink beam in case of respectively performing beam setting for a downlink and an uplink. In this case, it is assumed that a terminal knows of Q optimized uplink transmission beams and a base station knows of one or more optimized uplink reception beams. A third method is for setting an uplink beam in case of respectively performing beam setting for a downlink and an uplink. In this case, it is assumed that a base station knows of P optimized downlink transmission beams and a terminal knows of one or more optimized downlink reception beams.

Figure 1:
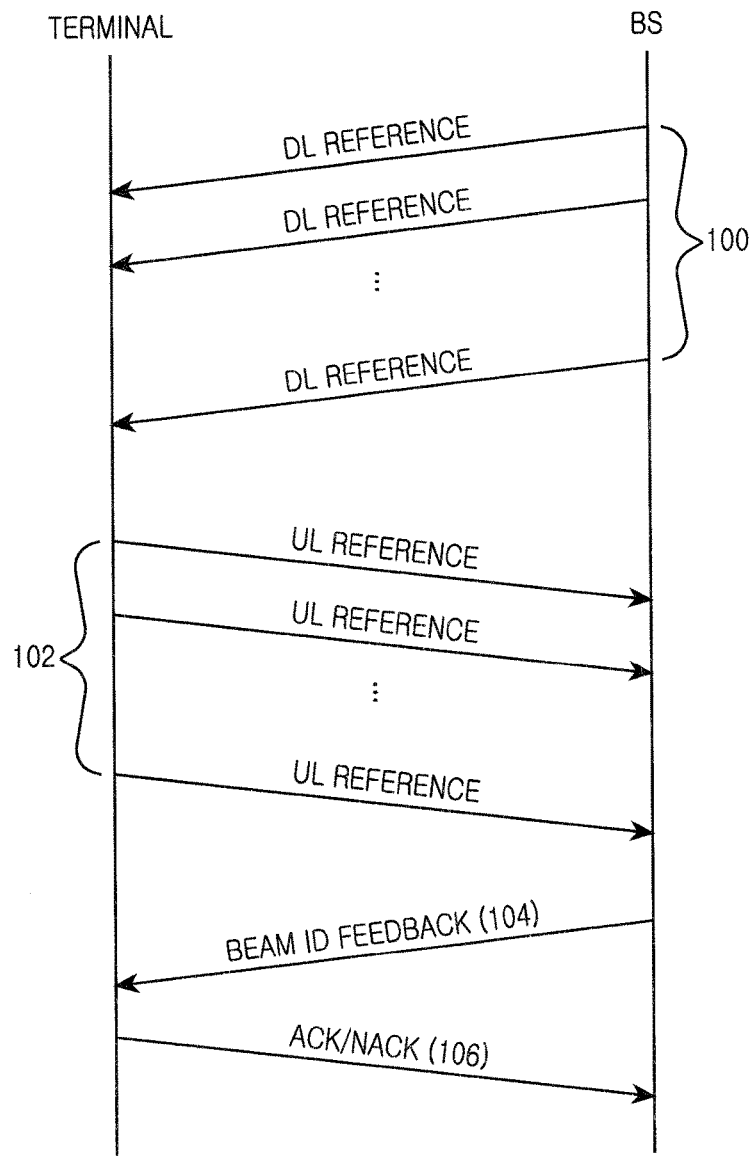
FIG. 1 illustrates a procedure for simultaneously performing beam setting for a downlink and an uplink, according to an exemplary embodiment of the present invention.

FIG. 1 illustrates a procedure for simultaneously performing beam setting for a downlink and an uplink, according to an exemplary embodiment of the present invention.

Figure 6A:
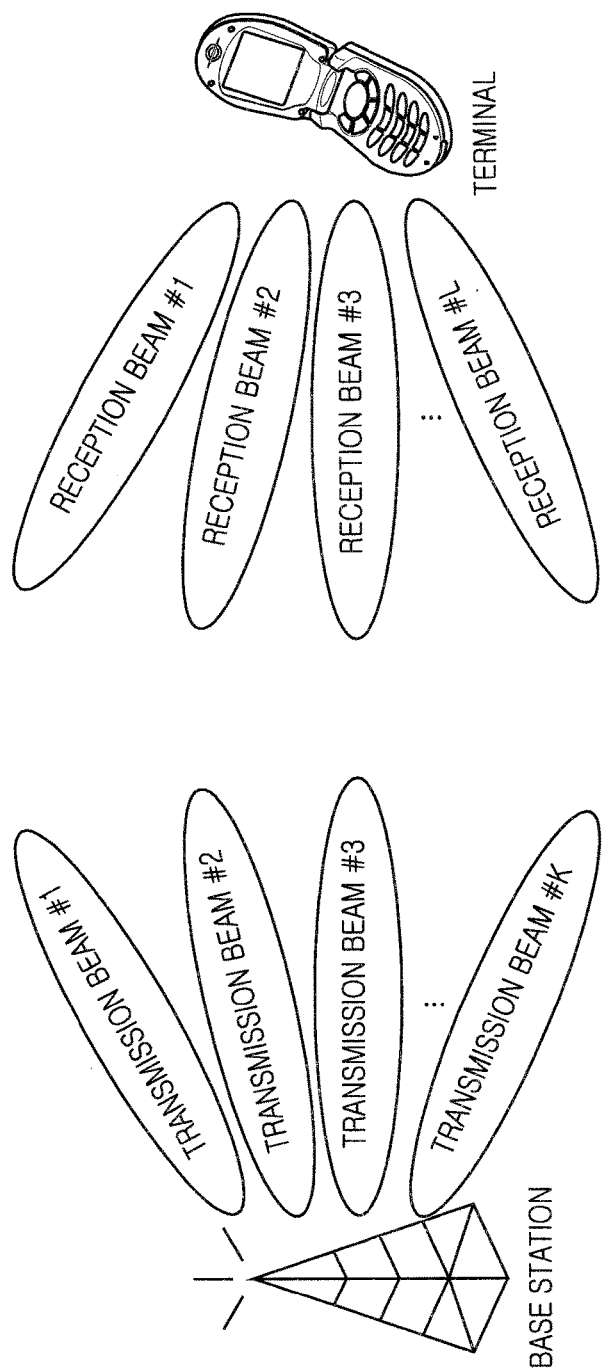
FIGS. 6A and 6B illustrate a transmission/reception beam pattern between a base station and a terminal according to an exemplary embodiment of the present invention.

Referring to FIG. 1, a base station repeatedly transmits a downlink reference signal, DL reference, N times so that a terminal, which may also be referred to as a Mobile Station (MS) may select one or more optimized downlink transmission and/or reception beams in step 100. Here, N=(Ntx×Nrx), wherein Ntx denotes a number of transmission beams whose direction is changed and transmitted by the base station, and Nrx denotes a number of times for which the base station repeatedly transmits a specific transmission beam for selecting a reception beam of the terminal. Ntx and Nrx are changeable system information values of which the base station may inform terminals via a broadcast channel, or any other suitable means of informing the terminals. The downlink reference signal may be a signal that may measure quality of a signal, such as a synchronization signal, a preamble signal, a pilot signal, or any other similar signal. For example, as illustrated in FIG. 6A, when the base station can is able to generate K transmission beam patterns and the terminal is able to generate L reception beam patterns, the base station should transmit a total of K*L downlink reference signals to the terminal during a specific time period.

Meanwhile, the terminal that has repeatedly received the downlink reference signal N times measures and selects P optimized downlink transmission/reception beam pairs via the downlink reference signal. For example, in FIG. 6A, the terminal may select one or more downlink transmission/reception beam pairs from among a total of N*N transmission/reception beam pairs. In FIG. 6A, a transmission beam #3 of the base station and a reception beam #3 of the terminal may become an optimized downlink transmission/reception beam pair.

After that, the terminal repeatedly transmits an uplink reference signal, UL Reference, including P optimized downlink transmission beam index information to the base station a total of M times in step 102. For example, a sequence corresponding to the reference signal may be mapped to the downlink transmission beam index information.

Figure 6B:
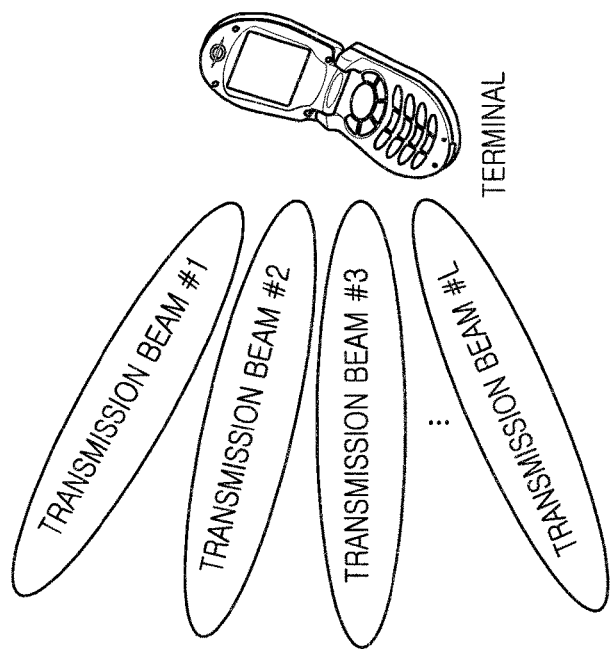

Here, M=(Mtx×Mrx), wherein Mtx denotes a number of transmission beams whose direction is changed and transmitted by the terminal, and Mrx denotes a number of times which the terminal repeatedly transmits a specific transmission beam for selecting a reception beam of the base station. Mtx and Mrx are changeable system information values of which the base station may inform terminals via a broadcast channel, or any other suitable means of informing the terminal. In addition, assuming downlink/uplink channel reciprocity, Mtx may be set to 1. The uplink reference signal denotes a signal that may measure quality of a signal, such as an access signal, a sounding signal, a pilot signal, or any other similar signal. For example, as shown in FIG. 6B, when the terminal is able to generate L transmission beam patterns and the base station is able to generate K reception beam patterns, the terminal should transmit N*N uplink reference signals to the base station during a specific time period.

According to an implementation, the number of transmission beam patterns and the number of reception beam patterns of the base station may be the same or different from each other. Likewise, the number of transmission beam patterns and the number of reception beam patterns of the terminal may be the same or different from each other.

Meanwhile, when transmitting the uplink reference signal in step 102, the terminal may control the direction, width, and other similar physical characteristics, of the uplink transmission beam according to an ACKnowledgement/ Negative ACKnowledgement (ACK/NACK) response that is transmitted previously by the base station in step 104. For example, when an ACK response is received from the base station in response to the uplink reference signal transmitted immediately previously by the terminal, then the terminal may transmit the uplink reference signal using a narrow beam having a narrower width than an optimized uplink transmission beam width that was fed back immediately previously by the base station. When a NACK response is received in response to the uplink reference signal transmitted immediately previously by the terminal, the terminal may transmit the uplink reference signal using a wide beam that was used for initial transmission.

The base station measures and selects Q optimized uplink transmission/reception beam pairs via the uplink reference signal transmitted by the terminal in step 104. In addition, the base station detects or decodes an optimized downlink transmission beam index included in the uplink reference signal. That is, the uplink reference signal may include a sequence corresponding to a downlink transmission beam index or a message to which a separate CRC has been attached.

In addition, when the base station successfully obtains P optimized downlink transmission beams and successfully detects or measures Q optimized uplink transmission beams in step 104, then the base station transmits Q optimized uplink transmission beam indexes and transmits ACK information to the terminal via one or more optimized downlink transmission beams. Here, the ACK information is transmitted as a response to successfully receiving P optimized downlink transmission beams transmitted via the uplink reference signal.

When the base station fails to receive the P optimized downlink transmission beams and successfully detects the Q optimized uplink transmission beams in step 104, then the base station transmits Q optimized uplink transmission beam indexes and transmits NACK information to the terminal. Also, the base station may command the terminal to transmit again P optimized downlink transmission beam indexes based on the previously received Q optimized uplink transmission beams.

Alternatively, when the base station fails to receive the P optimized downlink transmission beams and also fails to detect the Q optimized uplink transmission beams in step 104, then the base station may command the terminal to both transmit NACK information and perform step 102 again. Alternatively, the terminal may perform operations from step 102 according to a specific timer without the command of the base station. However, the present invention is not limited thereto, and the terminal may perform operations of step 102 according to any suitable reason. Furthermore, depending on implementation, the ACK/NACK transmission may be omitted in step 104.

Meanwhile, since the base station cannot know P optimized downlink transmission beams transmitted by the terminal at a time point when transmitting NACK, the base station may use a wide beam or the P optimized downlink transmission beams according to a previous successful reception. Assuming channel reciprocity for downlink/uplink, the base station may infer a downlink transmission beam instead of not detecting a downlink transmission beam by using one or more optimized uplink reception beams in a limited way. After that, when the terminal successfully receives Q optimized uplink transmission beam indexes transmitted by the base station via the ACK/NACK in step 106, then the terminal stores and updates a value thereof and transmits an ACK signal to the base station.

When the terminal fails to receive the Q optimized uplink transmission beam indexes transmitted by the base station, then the terminal transmits a NACK signal in the case where the terminal recognizes the failure or does not send any signal. In case of transmitting the NACK, since the terminal cannot know the Q optimized uplink transmission beams transmitted by the base station at such a time point, then the terminal may use a wide beam or Q optimized uplink transmission beams that were previously successfully received. Assuming channel reciprocity for downlink/uplink, the terminal may use one or more optimized uplink reception beams. In addition, when the base station determines that an ACK/NACK transmitted by the terminal is a NACK in step 106, then the base station may command the terminal to repeat operations from step 104.

Figure 2:
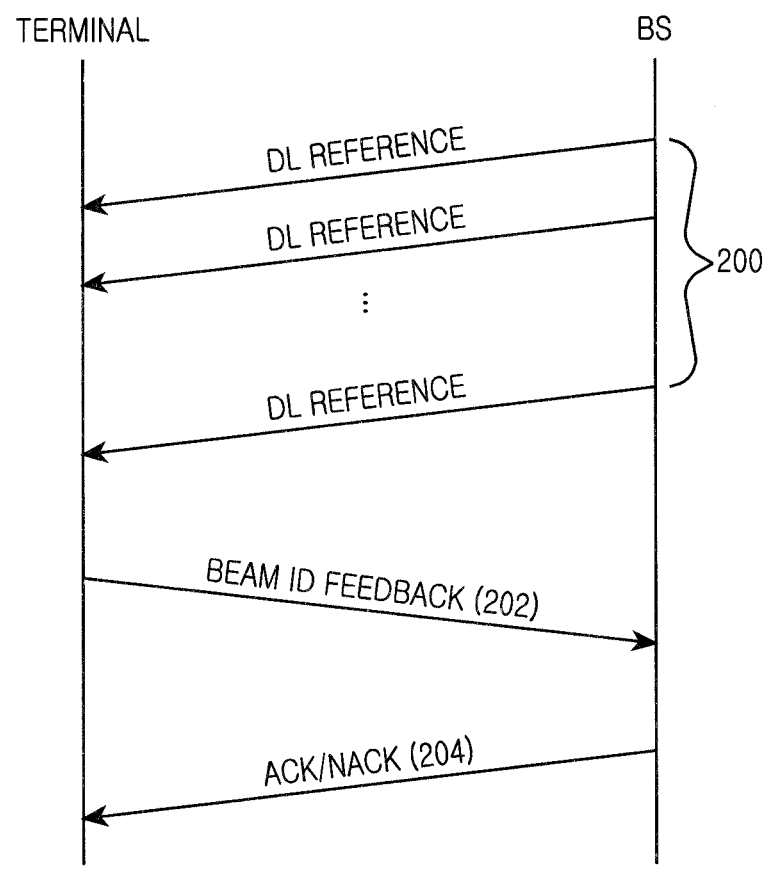
FIG. 2 illustrates a procedure for setting a downlink beam in case of performing beam setting for a downlink and an uplink, respectively, according to an exemplary embodiment of the present invention.

FIG. 2 illustrates a procedure for setting a downlink beam in case of performing beam setting for a downlink and an uplink, respectively, according to an exemplary embodiment of the present invention.

Referring to FIG. 2, a base station repeatedly transmits a downlink reference signal, DL Reference, N times so that a terminal may select one or more optimized downlink transmission/reception beams in step 200. Here, N=(Ntx×Nrx), wherein Ntx denotes a number of transmission beams whose direction is changed and transmitted by the base station, and Nrx denotes a number of times in which the base station repeatedly transmits a specific transmission beam for selecting a reception beam of the terminal. Ntx and Nrx are changeable system information values of which the base station may inform terminals via a broadcast channel, or other similar channels. The downlink reference signal may be a signal that can measure quality of a signal, such as a synchronization signal, a preamble signal, a pilot signal, or other similar signals.

At this point, the terminal, which may also be referred to as a Mobile Station (MS), measures and selects P optimized downlink transmission/reception beam pairs via a downlink reference signal in step 200. After that, the terminal transmits P optimized downlink transmission beam information to the base station via one or more predetermined uplink transmission beams in step 202. At this point, the base station detects or decodes the P optimized downlink transmission beam information. After that, when succeeding in obtaining the P optimized downlink transmission beam information, the base station transmits an ACK signal to the terminal in step 204.

When failing to obtain the P optimized downlink transmission beam information, the base station transmits a NACK signal to the terminal and requests the terminal to re-transmit the P optimized downlink transmission beam information, i.e., the terminal proceeds to step 202. According to another exemplary embodiment, when failing to obtain the P optimized downlink transmission beam information, the base station may transmit a NACK signal to the terminal, and perform steps 102 to 106 of FIG. 1. According to another exemplary embodiment, the base station may perform the operations of FIG. 3, as discussed below, and then perform steps 200 to 204 of FIG. 2.

Figure 3:
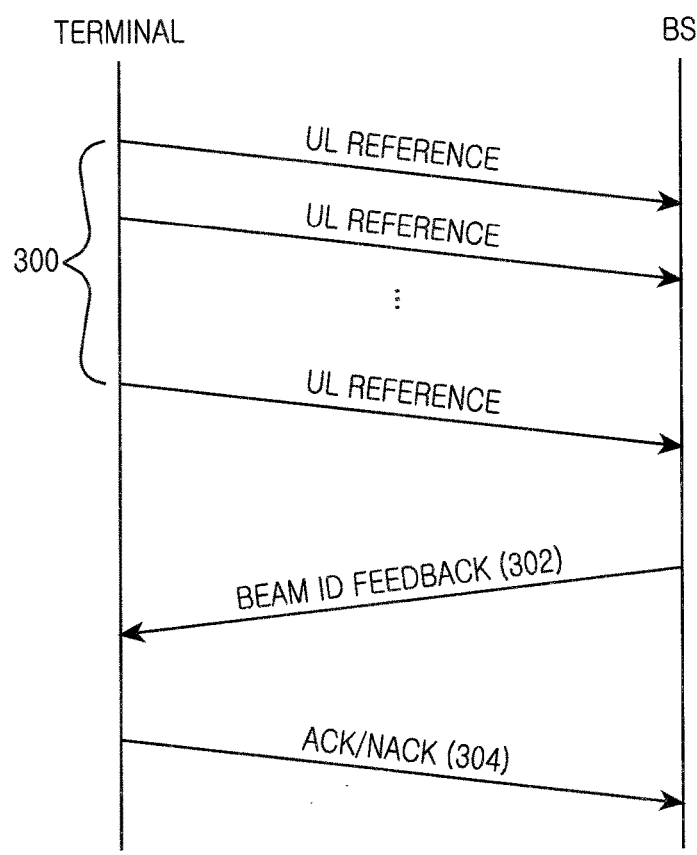
FIG. 3 illustrates a procedure for setting an uplink beam in case of performing beam setting for a downlink and an uplink, respectively, according to an exemplary embodiment of the present invention.

FIG. 3 illustrates a procedure for setting an uplink beam in case of respectively performing beam setting for a downlink and an uplink, according to an exemplary embodiment of the present invention.

Referring to FIG. 3, a terminal repeatedly transmits an uplink reference signal, UL Reference, to a base station N times in step 300. Here, M=(Mtx×Mrx, wherein Mtx denotes the number of transmission beams whose direction is changed and transmitted by the terminal, and Mrx denotes the number of times which the terminal repeatedly transmits a specific transmission beam for selecting a reception beam of the base station. Mtx and Mrx are changeable system information values of which the base station may inform terminals via a broadcast channel, or any other suitable channel. In addition, assuming downlink/uplink channel reciprocity, Mtx may be set to 1. The uplink reference signal denotes a signal that may measure quality of a signal, such as an access signal, a sounding signal, a pilot signal, or any other similar channel.

When transmitting an uplink reference signal, the terminal may control the direction, the width, or other similar physical characteristics, of an uplink transmission beam based on an ACK/NACK response transmitted by the base station in FIG. 2. For example, in the case where an ACK response is received in response to a beam index feedback signal transmitted by the terminal during a previous downlink beam tracking process, i.e., step 204 of FIG. 2, the terminal may transmit an uplink reference signal using a beam having a smaller width and a fine and improved gain based on an optimized uplink transmission beam fed back by a base station during a previous uplink beam tracking process. In the case where the NACK response is received in response to a beam index feedback signal transmitted by the terminal during a previous downlink beam tracking process, i.e., step 204 of FIG. 2, the terminal may transmit an uplink reference signal using a beam having a wide width that is used for an initial transmission.

At this point, the base station measures and selects Q optimized uplink transmission/reception beam pairs via an uplink reference signal. After that, when succeeding in measuring the Q optimized uplink transmission/reception beams in step 300, the base station transmits Q optimized uplink transmission beam information together with ACK information to a terminal using one or more optimized downlink transmission beams in step 302. When failing to measure the Q optimized uplink transmission/reception beams, that is, in the case where a size of the uplink reference signal cannot exceed a predetermined specific threshold, in step 300, then the base station may command the terminal to perform step 300 again together with transmitting the NACK information. However, the present invention is not limited thereto, and ACK/NACK information transmission may be omitted.

After that, when successfully receiving the Q optimized uplink transmission beam information transmitted by the base station, the terminal stores and updates a value thereof and sends an ACK signal to the base station in step 304. When failing to receive the Q optimized uplink transmission beam information, the terminal sends a NACK signal in the case where the terminal recognizes the failure or does not send any signal. At this point, when receiving the NACK signal sent from the terminal or when the base station determines a NACK was sent, the base station proceeds to step 302 to re-perform subsequent steps. According to an exemplary embodiment, when receiving a NACK response from the terminal or when the base station determines the NACK was sent, the base station performs steps 200 to 204 of FIG. 2, and then performs steps 300 to 304 of FIG. 3.

Figure 4:
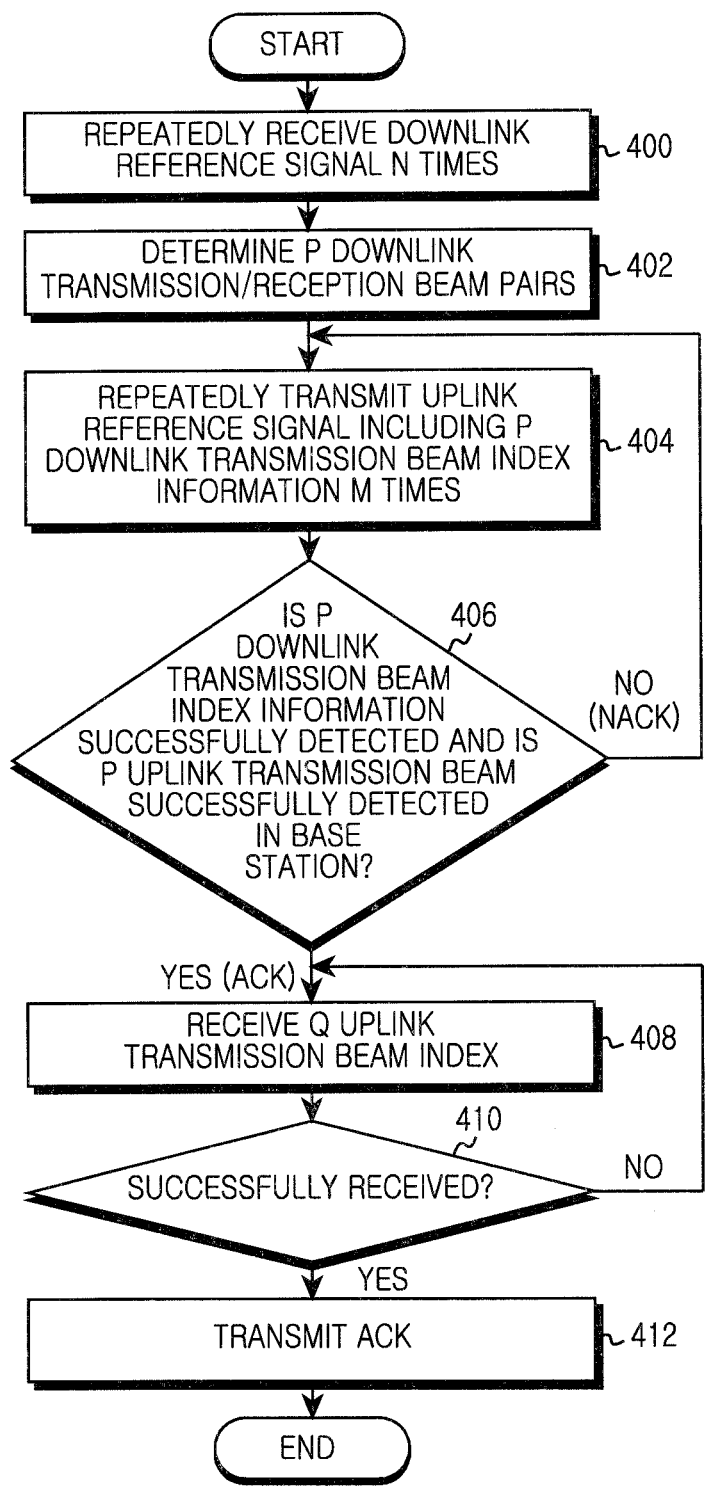
FIG. 4 is a flowchart illustrating a process for operating a terminal performing beam setting for a downlink and an uplink according to an exemplary embodiment of the present invention.

FIG. 4 is a flowchart illustrating a process for operating a terminal performing beam setting for a downlink and an uplink according to an exemplary embodiment of the present invention.

Referring to FIG. 4, a terminal receives a downlink reference signal from a base station N times in step 400. Here, N=(Ntx×Nrx), wherein Ntx denotes a number of transmission beams whose direction is changed and transmitted by the base station, and Nrx denotes a number of times for which the base station repeatedly transmits a specific transmission beam for selecting a reception beam of the terminal. Ntx and Nrx are changeable system information values of which the base station may inform terminals via a broadcast channel, or another similar channel. The downlink reference signal may be a signal that may measure quality of a signal, such as a synchronization signal, a preamble signal, a pilot signal, or other similar signal.

For example, as in FIG. 6A, when the base station is able to generate K transmission beam patterns and the terminal is able to generate L reception beam patterns, the base station may transmit a total of K*L downlink reference signals to the terminal during a specific time section. After that, the terminal that has received the downlink reference signal N times measures and selects P optimized downlink transmission/reception beam pairs via the downlink reference signal in step 402. For example, in FIG. 6A, the terminal may select at least one downlink transmission/reception beam pair from among N*N transmission/reception beam pairs. In FIG. 6A, a transmission beam #3 of the base station and a reception beam #3 of the terminal may become an optimized downlink transmission/reception beam pair.

After that, the terminal repeatedly transmits an uplink reference signal that includes P optimized transmission beam index information to the base station M times in step 404. For example, a sequence corresponding to the reference signal may be mapped to transmission beam index information. Here, M=(Mtx×Mrx), Mtx denotes the number of transmission beams whose direction is changed and transmitted by the terminal, and Mrx denotes the number of times for which the terminal repeatedly transmits a specific transmission beam for selecting a reception beam of the base station. Mtx and Mrx are changeable system information values of which the base station may inform terminals via a broadcast channel, or other similar channels. In addition, assuming downlink/uplink channel reciprocity, Mtx may be set to 1. The uplink reference signal denotes a signal that may measure quality of a signal, such as an access signal, a sounding signal, a pilot signal, or any other suitable signal.

For example, as shown in FIG. 6B, when the terminal is able to generate L transmission beam patterns and the base station is able to generate K reception beam patterns, the terminal may transmit a total of K*L uplink reference signals to the base station during a specific time section. According to an exemplary embodiment of the present invention, a number of transmission beam patterns and a number of reception beam patterns of the base station may be the same or different from each other. Likewise, the number of transmission beam patterns and the number of reception beam patterns of the terminal may be the same or different from each other.

Meanwhile, when transmitting the uplink reference signal, the terminal may control the direction, width, or other similar physical characteristics of the uplink transmission beam according to an ACK/NACK response transmitted previously by the base station. For example, when an ACK response is received from the base station in response to the uplink reference signal transmitted immediately previously by the terminal, the terminal may transmit the uplink reference signal using a narrow beam having a narrower width than an optimized uplink transmission beam width that was fed back immediately previously by the base station. When a NACK response is received in response to the uplink reference signal transmitted immediately previously by the terminal, the terminal may transmit the uplink reference signal using a wide beam used for initial transmission.

After that, when an optimized downlink transmission beam index that is included in the uplink reference signal is successfully detected by the base station and Q uplink transmission beams are successfully detected according to the uplink reference signal in step 406, then the terminal proceeds to step 408 to receive Q uplink transmission beam indexes from the base station. When the reception of P optimized downlink transmission beams by the base station fails and the detection of the Q optimized uplink transmission beams also fails in step 406, then the terminal proceeds to step 404 to re-transmit an uplink reference signal including P optimized transmission beam index information to the base station M times. In another implementation, when the reception of the P optimized downlink transmission beams by the base station fails and the detection of the Q optimized uplink transmission beams also fails in step 406, then the terminal proceeds to step 400 to receive and process a downlink reference signal again.

According to an exemplary embodiment, when the reception of P optimized downlink transmission beams by the base station fails and the Q optimized uplink transmission beams are successfully detected, then the terminal re-transmits P optimized downlink transmission beam indexes to the base station according to the previous Q optimized uplink transmission beams. After that, when successfully receiving Q optimized uplink transmission beam indexes transmitted by the base station in step 410, the terminal proceeds to step 412 to store and update a value thereof and sends an ACK signal to the base station. Furthermore, when failing to receive the Q optimized uplink transmission beam indexes transmitted by the base station, the terminal proceeds to step 408 to transmit an NACK signal, such as in the case where the terminal recognizes the failure or does not send any signal. At this point, the terminal proceeds to step 406 to re-request the base station to transmit Q optimized uplink transmission beam indexes and receive the same.

Figure 5:
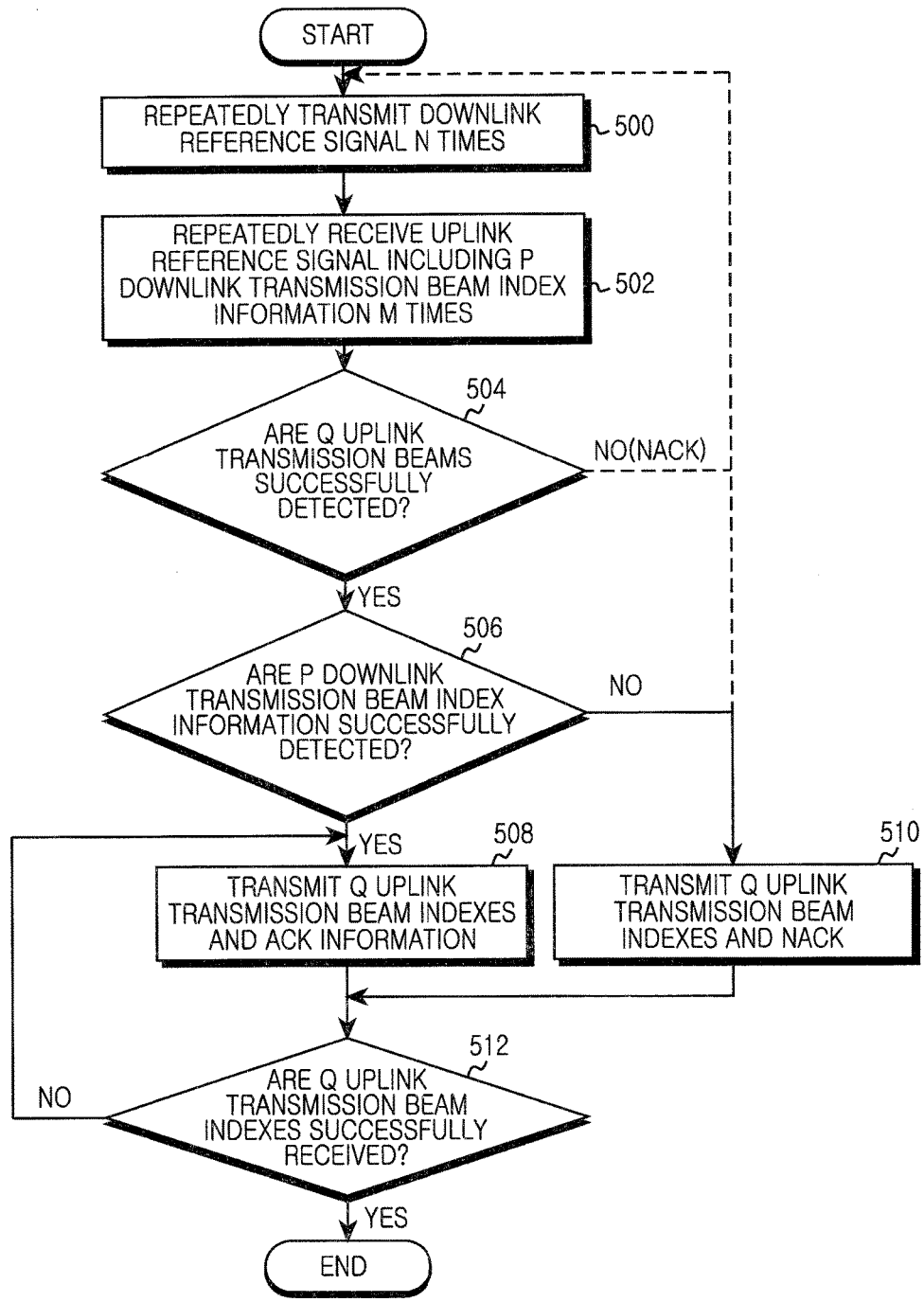
FIG. 5 is a flowchart illustrating a process for operating a base station performing beam setting for a downlink and an uplink according to an exemplary embodiment of the present invention.

FIG. 5 is a flowchart illustrating a process for operating a base station performing beam setting for a downlink and an uplink according to an exemplary embodiment of the present invention.

Referring to FIG. 5, the base station repeatedly transmits a downlink reference signal N times so that a terminal may select one or more optimized downlink transmission/reception beams in step 500. Here, N=(Ntx×Nrx), wherein Ntx denotes a number of transmission beams whose direction is changed and transmitted by the base station, and Nrx denotes a number of times which the base station repeatedly transmits a specific transmission beam for selecting a reception beam of the terminal. Ntx and Nrx are changeable system information values of which the base station may inform terminals via a broadcast channel, or any other similar channel. The downlink reference signal may be a signal that may measure quality of a signal, such as a synchronization signal, a preamble signal, a pilot signal, or any other similar signal.

For example, as illustrated in FIG. 6A, when the base station is able to generate K transmission beam patterns and the terminal is able to generate L reception beam patterns, the base station may transmit K*L downlink reference signals in total to the terminal during a specific time section.

After that, the base station receives an uplink reference signal, including P optimized transmission beam index information, from the terminal over M times to measure and select Q optimized uplink transmission/reception beam pairs via an uplink reference signal that is transmitted by the terminal in step 502. For example, a sequence corresponding to the reference signal may be mapped to the transmission beam index information. Here, M=(Mtx×Mrx), wherein Mtx denotes the number of transmission beams whose direction is changed and transmitted by the terminal, and Mrx denotes the number of times for which the terminal repeatedly transmits a specific transmission beam for selecting a reception beam of the base station. Mtx and Mrx are changeable system information values of which the base station may inform terminals via a broadcast channel, or other similar channel. In addition, assuming downlink/uplink channel reciprocity, Mtx may be set to 1. The uplink reference signal denotes a signal that may measure quality of a signal, such as an access signal, a sounding signal, a pilot signal, or other similar signal.

For example, as shown in FIG. 6B, when the terminal is able to generate K transmission beam patterns and the base station is able to generate L reception beam patterns, the terminal should transmit K*L uplink reference signals to the base station during a specific time section. According to an exemplary embodiment, the number of transmission beam patterns and the number of reception beam patterns of the base station may be the same or different from each other. Likewise, the number of transmission beam patterns and the number of reception beam patterns of the terminal may be the same or different from each other.

After that, the base station determines whether Q optimized uplink transmission beams are successfully detected in step 504. After the Q optimized uplink transmission beams are successfully detected, the base station determines whether P optimized downlink transmission beams are successfully detected. When the P optimized downlink transmission beams are successfully detected, the base station proceeds to step 508 to transmit Q optimized uplink transmission beam indexes and to transmit ACK information to the terminal via one or more optimized downlink transmission beams. Here, the ACK information is in response to successfully receiving P optimized downlink transmission beams transmitted via the uplink reference signal.

When failing to receive the P optimized downlink transmission beams and successfully detecting the Q optimized uplink transmission beams in step 506, the base station proceeds to step 510 to transmit the Q optimized uplink transmission beam indexes and NACK information to the terminal. Also, the base station may command the terminal to re-transmit the P optimized downlink transmission beam indexes to the terminal according to the previously received Q optimized uplink transmission beams.

Alternatively, when failing to receive the P optimized downlink transmission beams in step 506 and also failing to detect the Q optimized uplink transmission beam in step 504, then the base station proceeds to step 502 to re-receive, for M times, an uplink reference signal including P optimized transmission beam index information from the terminal to measure and select Q optimized uplink transmission/reception beam pairs via an uplink reference signal transmitted by the terminal. According to an exemplary embodiment, when failing to receive the P optimized downlink transmission beams in step 506 and also failing to detect the Q optimized uplink transmission beam in step 504, the base station proceeds to step 500 to restart from the downlink reference signal transmission step.

After that, when successfully receiving Q optimized uplink transmission beam indexes transmitted by the terminal in step 512, the base station ends the procedure of the present invention. When failing to receive the Q optimized uplink transmission beam indexes transmitted by the terminal, the base station proceeds to step 508 to retransmit Q uplink transmission beam indexes to the terminal.

Figure 7:
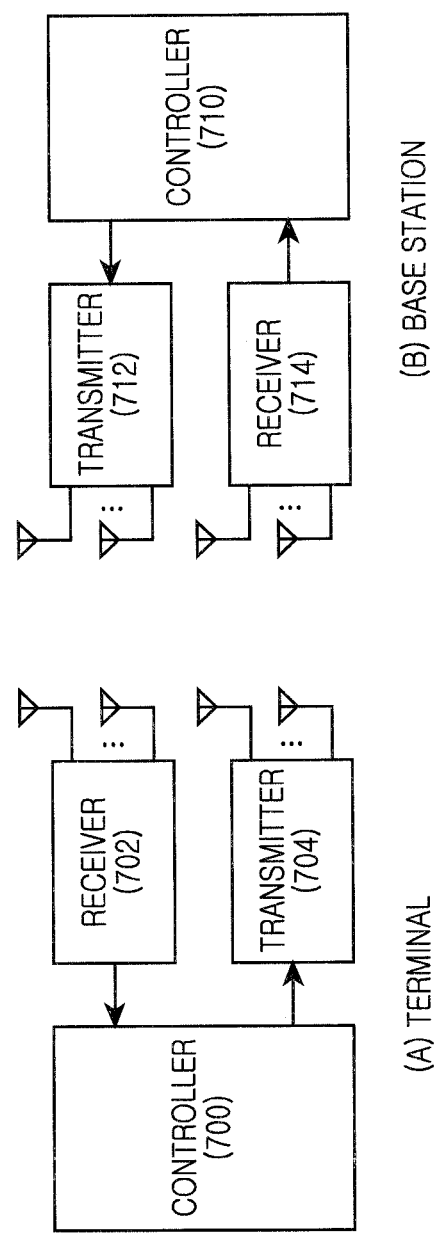
FIG. 7 is a block diagram illustrating an apparatus for setting a beam for a downlink and an uplink according to an exemplary embodiment of the present invention.

FIG. 7 is a block diagram illustrating an apparatus for setting a beam for a downlink and an uplink according to an exemplary embodiment of the present invention.

Referring to FIG. 7, a terminal includes a controller 700, a receiver 702, and a transmitter 704. Likewise, a base station includes a controller 710, a receiver 714, and a transmitter 712. The receivers 702 and 714 perform baseband signal-processing on a Radio Frequency (RF) signal received via a plurality of antennas.

For example, in case of using an OFDM scheme, the receiver converts an analog signal into sample data, and performs a Fast Fourier Transform (FFT) on the sample data to transform the sample data into data in a frequency domain, and selects data of subcarriers, which the receiver actually desires, to receive from the data in the frequency domain, and outputs the same. In addition, the receiver demodulates and decodes the data according to a predetermined Modulation and Coding Scheme (MCS) level to provide the decoded data to the controller 700 and 710. For another example, in case of using a CDMA scheme, the receiver 702 and 714 may channel-decode and despread the data.

The transmitters 704 and 712 convert baseband signal into an RF signal and transmits the RF signal. For example, the transmitters 704 and 712 encode and modulate data respectively received from the controllers 700 and 710 according to a predetermined MCS level. In addition, the transmitters 704 and 714 perform Inverse Fast Fourier Transform (IFFT) on a modulated symbol to output sample data, such as an OFDM symbol, converts the sample data into an analog signal, converts the analog signal into an RF signal, and outputs the RF signal via an antenna. For another example, the transmitter 704 and 712 may channel-code and spread data to be transmitted.

In the above configuration, the controllers 700 and 710 may serve as protocol controllers. The controller 700 controls an overall operation of the terminal. The controller 710 controls an overall operation of the base station. In addition, the controllers 700 and 710 receive required information from relevant portions of a physical layer while performing a protocol process, or generate a control signal for the relevant portion of the physical layer. In addition, the controllers 700 and 710 determine beam tracking and transmission/reception beam-forming patterns. That is, the controllers 700 and 710 control the operation of the terminal and the base station, as described in FIGS. 1 to 3.

For example, according to an exemplary embodiment, the controller 700 of the terminal receives a plurality of downlink reference signals from the base station to determine at least one downlink transmission beam pattern, transmits a plurality of uplink reference signals including index information corresponding to the determined at least one downlink transmission beam pattern to the base station, and receives ACK information indicating that an index corresponding to the at least one downlink transmission beam pattern has been successfully received in the base station from index information corresponding to an uplink transmission beam pattern and the plurality of uplink reference signals from the base station.

In addition, when successfully detecting index information corresponding to the uplink transmission beam pattern, as received from the base station, the controller 700 of the terminal transmits ACK information to the base station. When not successfully detecting the index information corresponding to the uplink transmission beam pattern, as received from the base station, the controller 700 of the terminal transmits NACK information to the base station. When successfully detecting index information corresponding to an uplink transmission beam pattern and receiving NACK information indicating that an index corresponding to the at least one downlink transmission beam pattern has not been successfully received in the base station from the plurality of uplink reference signals, the controller 700 of the terminal re-receives an index corresponding to at least one downlink transmission beam pattern from the base station based on a plurality of previous uplink transmission beam patterns.

Meanwhile, when not successfully detecting index information corresponding to an uplink transmission beam pattern from the base station and receiving NACK information indicating that an index corresponding to at least one downlink transmission beam pattern has not been successfully received in the base station from the plurality of uplink reference signals, the controller 700 of the terminal retransmits, to the base station, a plurality of uplink reference signals that include index information corresponding to the determined at least one downlink transmission beam pattern. Also, the controller 700 of the terminal further re-receives ACK information indicating that the index corresponding to the at least one downlink transmission beam pattern has been successfully received in the base station from the index information corresponding to the uplink transmission beam pattern and the plurality of uplink reference signals from the base station.

Furthermore, when the controller receives the NACK information indicating that the index corresponding to the at least one downlink transmission beam pattern has not been successfully received in the base station from the plurality of uplink reference signals, a wide beam pattern or a previously received at least one downlink transmission beam pattern is used as the downlink transmission beam pattern.

According to an exemplary embodiment of the present invention, the controller 710 of the base station transmits a plurality of downlink reference signals to the terminal, receives a plurality of uplink reference signals, including index information corresponding to at least one downlink transmission beam pattern determined by the terminal, from the terminal according to the plurality of downlink reference signals, and transmits ACK information indicating that index information corresponding to an uplink transmission beam pattern determined based on the plurality of uplink reference signals and an index corresponding to the at least one downlink transmission beam pattern have been successfully received.

Also, upon successfully detecting index information corresponding to the uplink transmission beam pattern via the terminal, the controller 710 of the base station receives ACK information from the terminal. Upon not successfully detecting the index information corresponding to the uplink transmission beam pattern via the terminal, the controller 710 of the base station receives NACK information from the terminal.

Meanwhile, when successfully detecting the index information corresponding to the uplink transmission beam pattern and transmitting NACK information indicating that the index corresponding to the at least one downlink transmission beam pattern has not been successfully received from the plurality of uplink reference signals, the controller 710 of the base station re-transmits an index corresponding to the at least one downlink transmission beam pattern to the terminal according to the plurality of previous uplink transmission beam patterns.

Upon not successfully detecting index information corresponding to an uplink transmission beam pattern and transmitting NACK information indicating that the index corresponding to the at least one downlink transmission beam pattern has not been successfully received from the plurality of uplink reference signals, then the controller 710 of the base station re-receives a plurality of uplink reference signals including index information corresponding to the determined at least one downlink transmission beam pattern, and then retransmits ACK information indicating that an index corresponding to the at least one downlink transmission beam pattern has been successfully received from index information corresponding to an uplink transmission beam pattern and the plurality of uplink reference signals to the terminal.

At this point, upon receiving NACK information indicating that an index corresponding to the at least one downlink transmission beam pattern has not been successfully received from the plurality of uplink reference signals, a wide beam pattern or a previously received at least one downlink transmission beam pattern may be used as the downlink transmission beam pattern.

According to an exemplary embodiment of the present invention, the controller 700 of the terminal determines one or more uplink transmission beam patterns and one or more uplink reception beam patterns, and also receives a plurality of downlink reference signals from the base station to determine at least one downlink transmission beam pattern. Furthermore, the controller 700 transmits index information corresponding to at least one downlink transmission pattern to the base station using the determined at least one uplink transmission beam pattern, and when index information corresponding to the at least one downlink transmission beam pattern is successfully received by the base station, the controller 700 of the terminal receives ACK information from the base station.

At this point, when the index information corresponding to the at least one downlink transmission beam pattern is not successfully received by the base station, the controller 700 of the terminal retransmits index information corresponding to at least one downlink transmission beam pattern to the base station using the determined at least one uplink transmission beam pattern.

When the index information corresponding to the at least one downlink transmission beam pattern is not successfully received by the base station, the controller 700 of the terminal transmits a plurality of uplink reference signals to the base station, receives index information corresponding to an uplink transmission beam pattern from the base station, and transmits an ACK or a NACK according to whether index information corresponding to the uplink transmission beam pattern is received.

According to an exemplary embodiment of the present invention, the controller 710 of the base station determines one or more uplink transmission beam patterns and one or more uplink reception beam patterns, and also transmits a plurality of downlink reference signals. The controller 710 also receives index information corresponding to at least one downlink transmission beam pattern determined by the terminal based on the plurality of downlink reference signals from the terminal, and when an index corresponding to the at least one downlink transmission beam pattern is successfully received, the controller 710 transmits ACK information to the terminal.

According to an exemplary embodiment of the present invention, the controller 700 of the terminal determines one or more downlink transmission beam patterns and one or more downlink reception beam patterns, transmits a plurality of uplink reference signals to the base station, receives index information corresponding to an uplink transmission beam pattern according to the plurality of uplink reference signals from the base station, and transmits an ACK or a NACK according to whether the index information corresponding to the uplink transmission beam pattern is received.

Also, when index information corresponding to an uplink transmission beam pattern is not successfully detected by the base station, the controller 700 of the terminal retransmits a plurality of uplink reference signals to the base station and re-receives the index information corresponding to the uplink transmission beam pattern based on the plurality of uplink reference signals from the base station. Additionally, when the index information corresponding to the uplink transmission beam pattern is not successfully detected by the base station, the controller 700 of the terminal receives a plurality of downlink reference signals from the base station to determine at least one downlink transmission beam pattern, transmits the index information corresponding to the at least one downlink transmission pattern to the base station, transmits a plurality of uplink reference signals to the base station, and receives index information corresponding to an uplink transmission beam pattern according to the plurality of uplink reference signals from the base station.

According to an exemplary embodiment of the present invention, the controller 710 of the base station determines one or more downlink transmission beam patterns and one or more downlink reception beam patterns, receives a plurality of uplink reference signals from the terminal, transmits index information corresponding to an uplink transmission beam pattern to the terminal based on the plurality of uplink reference signals, and receives an ACK or a NACK according to whether the index information corresponding to the uplink transmission beam pattern is received.

Figure 8:
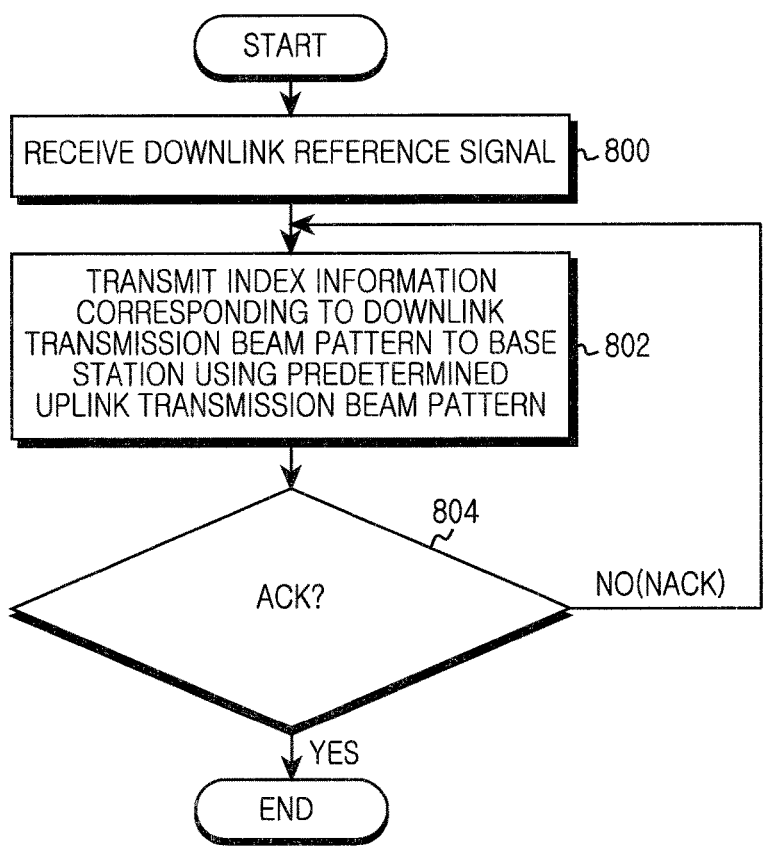
FIG. 8 is a flowchart illustrating a process for operating a terminal performing beam setting for a downlink and an uplink according to an exemplary embodiment of the present invention.

FIG. 8 is a flowchart illustrating a process for operating a terminal performing beam setting for a downlink and an uplink according to an exemplary embodiment of the present invention.

Referring to FIG. 8, the terminal determines one or more uplink transmission beam patterns and one or more uplink reception beam patterns, and receives a plurality of downlink reference signals in step 800. After that, the terminal determines at least one downlink transmission beam pattern based on a received downlink reference signal, and transmits index information corresponding to at least one downlink transmission pattern to the base station using the determined one or more uplink transmission beam patterns in step 802. After that, when index information corresponding to the at least one downlink transmission beam pattern is not successfully received by the base station in step 804, the terminal proceeds to step 802 to retransmit index information corresponding to at least one downlink transmission beam pattern to the base station using the determined at least one uplink transmission beam pattern.

According to an exemplary embodiment, when index information corresponding to the at least one downlink transmission beam pattern is not successfully received by the base station, the terminal transmits a plurality of uplink reference signals to the base station, receives index information corresponding to an uplink transmission beam pattern from the base station, and transmits an ACK or a NACK according to whether the index information corresponding to the uplink transmission beam pattern is received. In contrast, when receiving ACK information from the base station in response to transmission of at least one downlink transmission beam index in step 804, the terminal ends the beam tracking procedure of the present invention.

Figure 9:
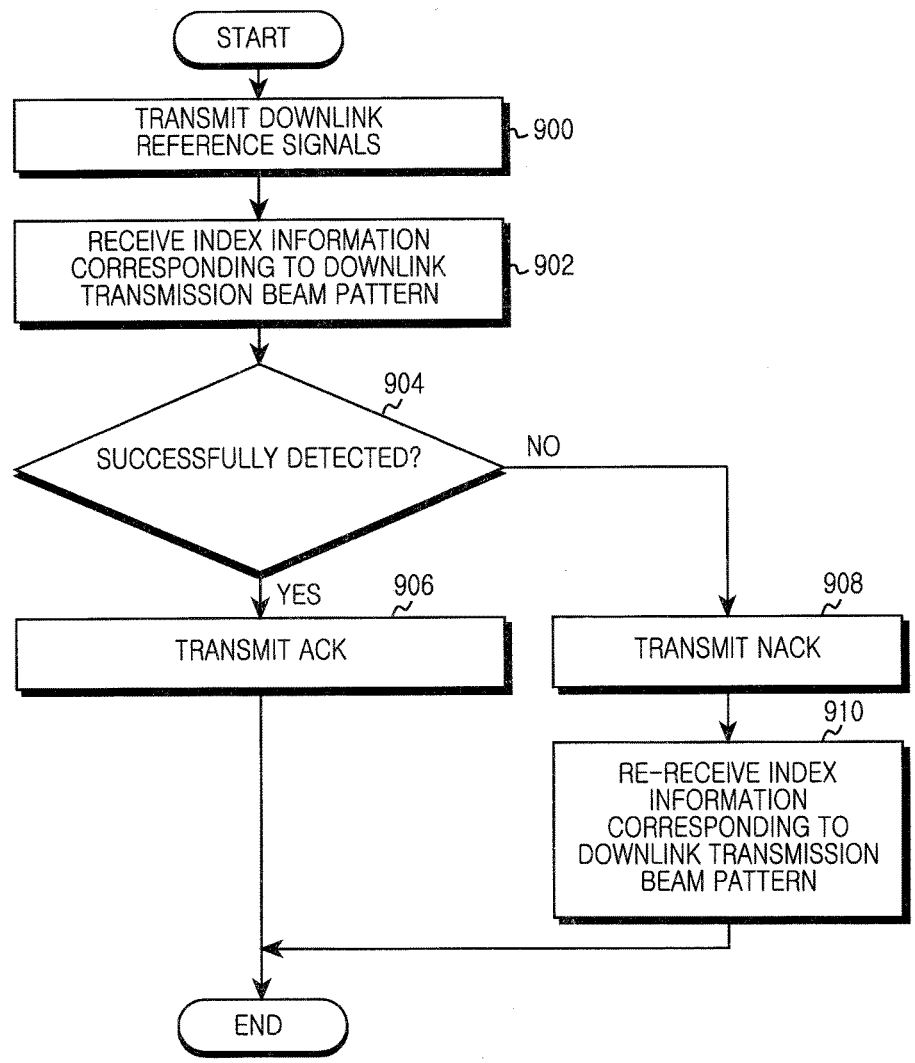
FIG. 9 is a flowchart illustrating a process for operating a base station performing beam setting for a downlink and an uplink according to an exemplary embodiment of the present invention.

FIG. 9 is a flowchart illustrating a process for operating a base station performing beam setting for a downlink and an uplink according to an exemplary embodiment of the present invention.

Referring to FIG. 9, the base station determines one or more uplink transmission beam patterns and one or more uplink reception beam patterns and then transmits a plurality of downlink reference signals to a terminal in step 900. Next, in step 902, the base station receives, from the terminal, index information corresponding to at least one downlink transmission beam pattern as determined by the terminal based on the plurality of downlink reference signals.

After that, upon successfully detecting index information corresponding to a downlink transmission beam pattern in step 904, the base station proceeds to step 906 to transmit ACK information to the terminal. On the other hand, when not successfully detecting the index information corresponding to the downlink transmission beam pattern in step 904, the base station proceeds to step 908 to transmit NACK information to the terminal and then proceeds to step 910 to re-receive index information corresponding to at least one downlink transmission beam pattern from the terminal.

Figure 10:
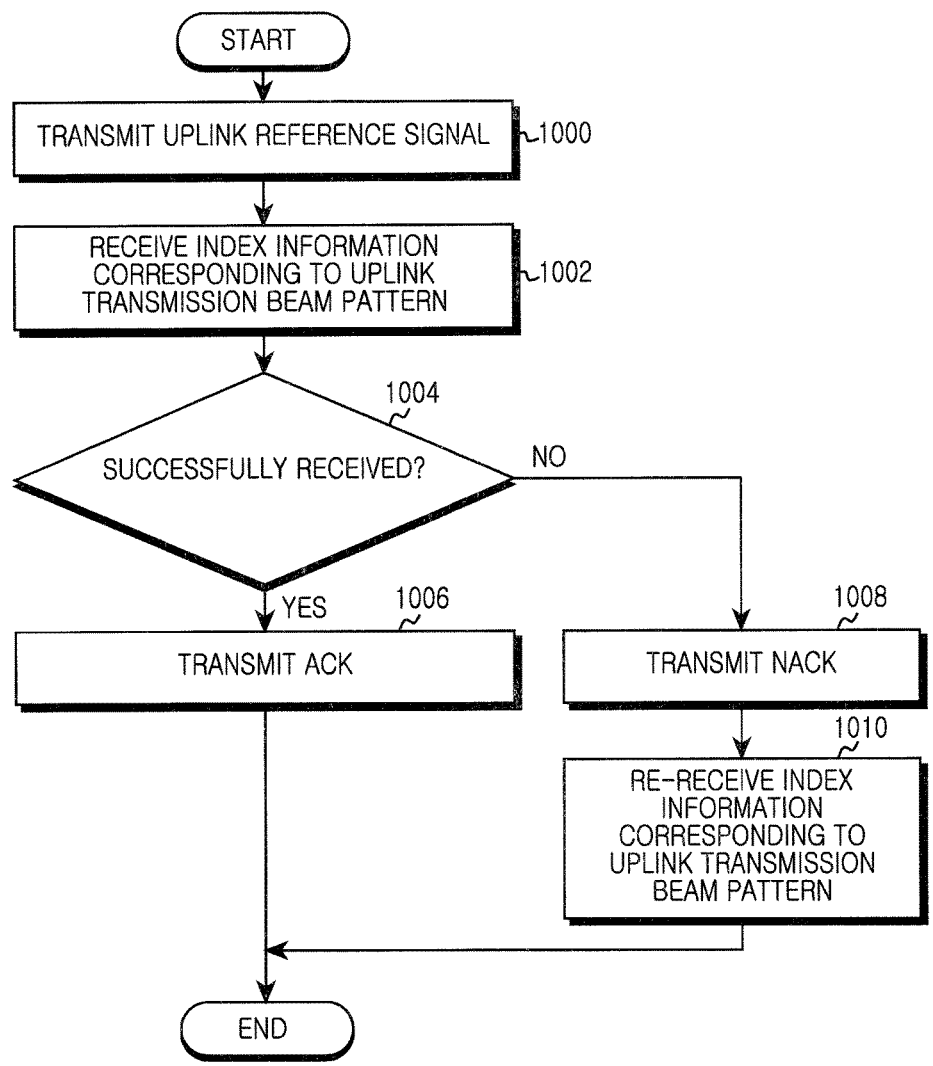
FIG. 10 is a flowchart illustrating a process for operating a terminal performing beam setting for a downlink and an uplink according to an exemplary embodiment of the present invention.

FIG. 10 is a flowchart illustrating a process for operating a terminal performing beam setting for a downlink and an uplink according to an exemplary embodiment of the present invention.

Referring to FIG. 10, the terminal determines one or more downlink transmission beam patterns and one or more downlink reception beam patterns, and then transmits a plurality of uplink reference signals to the base station in step 1000. After that, the terminal receives index information corresponding to an uplink transmission beam pattern from the base station based on the plurality of uplink reference signals in step 1002.

After that, the terminal determines whether index information corresponding to an uplink transmission beam pattern has been successfully received in step 1004. When the index information corresponding to the uplink transmission beam pattern has been successfully received, the terminal proceeds to step 1006 to transmit an ACK message. On the other hand, when it is determined that the index information corresponding to the uplink transmission beam pattern has not been successfully received at step 1004, then the terminal transmits NACK in step 1008, and retransmits a plurality of uplink reference signals to the base station. Next, the terminal proceeds to step 1010 and re-receives index information corresponding to an uplink transmission beam pattern from the base station based on the plurality of uplink reference signals.

According to another exemplary embodiment, when index information corresponding to an uplink transmission beam pattern is not successfully received by the base station, then the terminal receives a plurality of downlink reference signals from the base station to determine at least one downlink transmission beam pattern. Furthermore, the base station then transmits index information corresponding to the at least one downlink transmission pattern to the base station, transmits a plurality of uplink reference signals to the base station, and receives index information corresponding to an uplink transmission beam pattern from the base station based on the plurality of uplink reference signals.

Figure 11:
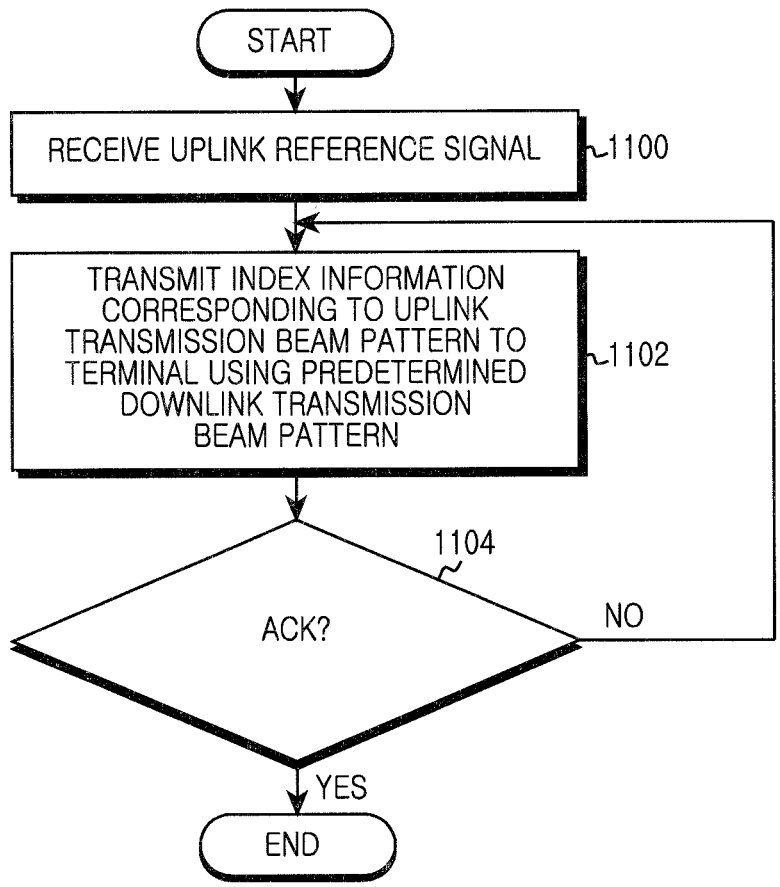
FIG. 11 is a flowchart illustrating a process for operating a base station performing beam setting for a downlink and an uplink according to an exemplary embodiment of the present invention.

FIG. 11 is a flowchart illustrating a process for operating a base station performing beam setting for a downlink and an uplink according to an exemplary embodiment of the present invention.

Referring to FIG. 11, the base station determines one or more downlink transmission beam patterns and one or more downlink reception beam patterns, and receives a plurality of uplink reference signals from a terminal in step 1100. After that, in step 1102, the base station transmits index information corresponding to an uplink transmission beam pattern to the terminal based on the plurality of uplink reference signals.

After that, when it is determined in step 1104 that an ACK message is received in response to index information corresponding to the uplink transmission beam pattern, the base station ends the beam tracking procedure of the present invention. On the other hand, when receiving a NACK message in response to the index information corresponding to the uplink transmission beam pattern, i.e., when it is determined in step 1104 that an ACK message is not received, then the base station proceeds to step 1102 to retransmit the index information corresponding to at least one downlink transmission beam pattern to the terminal.

As described above, when an index corresponding to a downlink transmission/reception beam pattern and an index corresponding to an uplink transmission/reception beam pattern are received, an index retransmission procedure corresponding to a transmission/reception beam pattern is defined, so that a wireless communication system may efficiently select a transmission/reception beam-forming pattern.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a terminal in a wireless communication system, the method comprising:

transmitting, to a base station, at least one reference signal through at least one first transmission beam; and if acknowledgement (ACK) information for the at least one reference signal is received from the base station, transmitting, to the base station, the at least one reference signal through at least one second transmission beam, wherein a width of the at least one second transmission beam is narrower than a width of the at least one first transmission beam.

2. The method of claim 1, wherein the width of the at least one second transmission beam is wider than the width of the at least one first transmission beam, if negative acknowledgement (NACK) information for the at least one reference signal is received from the base station.

3. The method of claim 1, wherein the ACK information indicates that the at least one reference signal has been received by the base station.

4. The method of claim 2, wherein the NACK information indicates that the at least one reference signal has not been received by the base station.

5. The method of claim 1, wherein the transmitting, to the base station, of the at least one reference signal through the at least one first transmission beam comprises transmitting, to the base station, the at least one reference signal for a plurality of times.

6. The method of claim 5, wherein the plurality of times is determined based on a first number and a second number, wherein the first number comprises a number of at least one transmission beam whose direction has changed, and wherein the second number comprises a number that the terminal transmits the at least one reference signal through a transmission beam among the at least one transmission beam.

7. The method of claim 6, wherein the first number and the second number comprise changeable system information, and wherein the first number and the second number are transmitted from the base station to the terminal.

8. The method of claim 6, wherein the first number is set to 1, if an uplink channel and a downlink channel are reciprocal.

9. An apparatus for a terminal in a wireless communication system, the apparatus comprising:

a transceiver configured to:

transmit, to a base station, at least one reference signal through at least one first transmission beam, and if acknowledgement (ACK) information for the at least one reference signal is received from the base station, transmit, to the base station, the at least one reference signal through at least one second transmission beam, wherein a width of the at least one second transmission beam is narrower than a width of the at least one first transmission beam.

10. The apparatus of claim 9, wherein the width of the at least one second transmission beam is wider than the width of the at least one first transmission beam, if negative acknowledgement (NACK) information for the at least one reference signal is received from the base station.

11. The apparatus of claim 9, wherein the transceiver is further configured to transmit, to the base station, the at least one reference signal for a plurality of times.

12. The apparatus of claim 11,
wherein the plurality of times is determined based on a first number and a second number,
wherein the first number comprises a number of at least one transmission beam whose direction has changed, and
wherein the second number comprises a number that the terminal transmits the at least one reference signal through a transmission beam among the at least one transmission beam.

13. The apparatus of claim 12,
wherein the first number and the second number comprise changeable system information, and
wherein the first number and the second number are transmitted from the base station to the terminal.

14. The apparatus of claim 12, wherein the first number is set to 1, if an uplink channel and a downlink channel are reciprocal.

\* \* \* \* \*